US008894487B2

(12) United States Patent
Granger et al.

(10) Patent No.: US 8,894,487 B2
(45) Date of Patent: Nov. 25, 2014

(54) GAMING MACHINE HAVING CHAIR WITH MODULAR BACK PANEL

(75) Inventors: Toriono A. Granger, Chicago, IL (US); Eric T. Miner, Chicago, IL (US); Norman R. Wurz, Des Plaines, IL (US)

(73) Assignee: WMS Gaming Inc., Waukegan, IL (US)

(*) Notice: Subject to any disclaimer, the term of this patent is extended or adjusted under 35 U.S.C. 154(b) by 179 days.

(21) Appl. No.: 13/160,252

(22) Filed: Jun. 14, 2011

(65) Prior Publication Data

US 2012/0322564 A1 Dec. 20, 2012

(51) Int. Cl.

| | |
|---|---|
| ***A63F 9/24*** | (2006.01) |
| ***A63F 13/00*** | (2014.01) |
| ***A63F 13/90*** | (2014.01) |

(52) U.S. Cl.

CPC ...................................... *A63F 13/08* (2013.01)
USPC ............ 463/31; 463/46; 463/47; 297/188.04; 297/188.06; 297/217.3

(58) Field of Classification Search

None

See application file for complete search history.

(56) References Cited

U.S. PATENT DOCUMENTS

| | | | | |
|---|---|---|---|---|
| 2,517,433 | A * | 8/1950 | Hoven et al. | 297/452.1 |
| 5,713,633 | A * | 2/1998 | Lu | 297/364 |
| 6,199,948 | B1 * | 3/2001 | Bush et al. | 297/217.3 |
| 6,698,832 | B2 * | 3/2004 | Boudinot | 297/217.4 |
| 6,702,375 | B1 * | 3/2004 | Laskowski et al. | 297/188.07 |
| 6,739,654 | B1 * | 5/2004 | Shen et al. | 297/188.04 |
| 6,860,814 | B2 * | 3/2005 | Cole | 463/46 |
| 6,899,390 | B2 * | 5/2005 | Sanfrod et al. | 297/217.4 |
| 7,019,794 | B2 * | 3/2006 | Norvell et al. | 348/838 |
| 7,188,895 | B1 * | 3/2007 | Espina et al. | 297/217.3 |
| D559,328 | S | 1/2008 | Rasmussen et al. | D21/333 |
| 7,479,063 | B2 | 1/2009 | Pryzby et al. | 463/35 |
| 7,823,947 | B1 * | 11/2010 | Parkinson et al. | 296/37.13 |
| 8,672,766 | B1 * | 3/2014 | Hancherick | 463/46 |
| 2005/0101374 | A1 * | 5/2005 | Acres | 463/25 |
| 2005/0201080 | A1 * | 9/2005 | Seward | 362/97 |
| 2005/0204596 | A1 * | 9/2005 | Peng | 40/320 |
| 2005/0255907 | A1 * | 11/2005 | Gauselmann et al. | 463/20 |
| 2005/0261057 | A1 * | 11/2005 | Bleich et al. | 463/30 |
| 2007/0105610 | A1 * | 5/2007 | Anderson | 463/16 |
| 2007/0270216 | A1 | 11/2007 | Pryzby | 463/35 |
| 2008/0039215 | A1 | 2/2008 | Hahn | 463/47 |
| 2008/0054561 | A1 * | 3/2008 | Canterbury et al. | 273/148 B |
| 2008/0209776 | A1 * | 9/2008 | Suprina | 40/1 |
| 2008/0211276 | A1 | 9/2008 | Rasmussen | 297/217.3 |

(Continued)

FOREIGN PATENT DOCUMENTS

| | | | | |
|---|---|---|---|---|
| WO | WO 2005/117648 A1 | 12/2005 | | A47B 97/00 |
| WO | WO 2005/117649 A1 | 12/2005 | | A47B 97/00 |
| WO | WO 2011/060331 A1 | 5/2011 | | A63F 9/24 |

*Primary Examiner* — Steven J Hylinski
(74) *Attorney, Agent, or Firm* — Nixon Peabody LLP

(57) ABSTRACT

A gaming system includes a gaming machine and a gaming chair for playing a wagering game. The gaming machine includes at least one display configured to display outcomes of the wagering game. The gaming machine further includes at least one wager input device configured to receive wagers from players. The gaming chair includes a seat assembly attached to a base, a cable harness for providing electrical input, and a backrest assembly having an inner structure and a back housing. The back housing is mounted to the inner structure and has a modular mounting feature for receiving one of at least two modular back panels. The modular back panels are received one at a time and include a non-illuminated back panel and an illuminated back panel. The illuminated back panel has a connector for accepting the cable harness.

30 Claims, 12 Drawing Sheets

(56) References Cited

U.S. PATENT DOCUMENTS

| | | | | |
|---|---|---|---|---|
| 2009/0209324 | A1* | 8/2009 | Graf | 463/25 |
| 2011/0003631 | A1 | 1/2011 | Tastad | 463/25 |
| 2011/0109134 | A1* | 5/2011 | Filipour et al. | 297/217.4 |
| 2011/0111839 | A1 | 5/2011 | Lesley et al. | 463/25 |
| 2011/0111847 | A1 | 5/2011 | Lesley et al. | 463/30 |

* cited by examiner

GAMING MACHINE HAVING CHAIR WITH MODULAR BACK PANEL

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to a modular gaming chair for changing between a non-illuminated and an illuminated back panel.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

In combination with the gaming terminals, gaming chairs have been used to facilitate player comfort and convenience. The gaming chairs may include various features directed to player convenience and gaming-environment ambiance. For example, some gaming chairs may include stationary footrests, adjustable headrests, adjustable-height seat cushions, sound systems, and/or lighting systems.

SUMMARY OF THE INVENTION

According to one aspect of the present invention, a gaming system includes a gaming machine and a gaming chair for playing a wagering game. The gaming machine includes at least one display configured to display outcomes of the wagering game. The gaming machine further includes at least one wager input device configured to receive wagers from players. The gaming chair includes a seat assembly attached to a base, a cable harness for providing electrical input, and a backrest assembly having an inner structure and a back housing. The back housing is mounted to the inner structure and has a modular mounting feature for receiving one of at least two modular back panels. The modular back panels are received one at a time and include a non-illuminated back panel and an illuminated back panel. The illuminated back panel has a connector for accepting the cable harness.

According to another aspect of the invention, a gaming system for playing a wagering game includes a gaming machine and a gaming chair. The gaming chair includes a base for supporting a backrest assembly, which has a back housing with a modular mounting feature for receiving, one at a time, modular back panels. The modular back panels include an illuminated back panel and a non-illuminated back panel, the illuminated back panel being in electrical communication with the gaming chair.

According to another aspect of the invention, a gaming system includes a gaming machine and a gaming chair for conducting a wagering game. The gaming chair has a base for supporting a seat assembly and a backrest assembly. The backrest assembly has a modular feature for modularly receiving, one at a time, one of a plurality of different back panels. The back panels include a non-illuminated back panel and an illuminated back panel. The backrest assembly has an electrical connection for providing electrical input to the illuminated back panel.

According to another aspect of the invention, a method is directed to transforming a gaming chair of a gaming system, the gaming system including a gaming machine for conducting a wagering game. The gaming chair includes a backrest assembly supported by a base, the backrest assembly having a back housing with a modular mounting feature. The method includes mounting, by the modular mounting feature, a first modular back panel. The first modular back panel is one of an illuminated back panel and a non-illuminated back panel and is electrically coupled with the gaming chair if the first modular back panel is the illuminated back panel. The first modular back panel is removed from the modular mounting feature and a second modular back panel is mounted, by the modular mounting feature. The second modular back panel is the other one of the illuminated back panel and the non-illuminated back panel and is electrically coupled with the gaming chair if the second modular back panel is the illuminated back panel.

Additional aspects of the invention will be apparent to those of ordinary skill in the art in view of the detailed description of various embodiments, which is made with reference to the drawings, a brief description of which is provided below.

Figure 1:
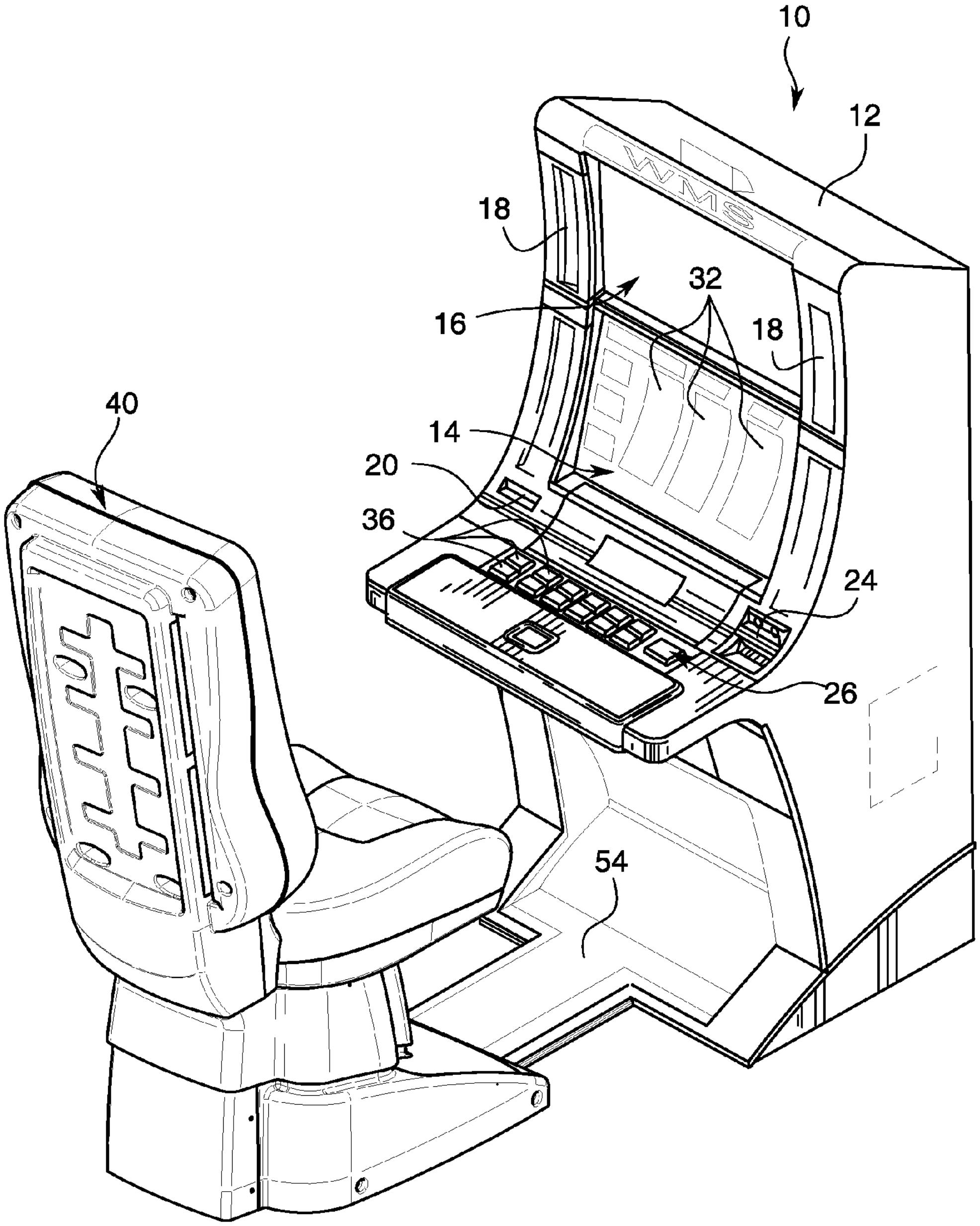
FIG. 1 is a perspective view of an exemplary gaming terminal with a gaming chair according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming system 10 having a gaming terminal 11 similar to those used in gaming establishments, such as casinos. With regard to the present invention, the gaming terminal 11 may be any type of gaming terminal and may have varying structures and methods of operation. For example, in some aspects, the gaming terminal 11 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 11 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled “Handheld Device for Wagering Games,” which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 11 illustrated in FIG. 1 comprises a cabinet or housing 12. For output devices, this embodiment of the gaming terminal 11 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 11 illustrated in FIG. 1 includes a bill validator 20, a coin acceptor (not shown), one or more information readers 24, one or more player-input devices 26, and one or more player-accessible ports 28 (e.g., an audio output jack for headphones, a video headset jack, a wireless transmitter/receiver, etc., shown in FIG. 2). While these typical components found in the gaming terminal 11 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled “Reel Spinning Slot Machine With Superimposed Video Image,” which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 11, or other form factor, such as is shown by way of example in FIG. 1. The primary display area 14 includes, in relation to many aspects of wagering games conducted on the gaming terminal 11, one or more paylines 30 (see FIG. 3) extending along a portion of the primary display area. In the illustrated embodiment of FIG. 1, the primary display area 14 comprises a plurality of mechanical reels 32 and a video display 34 (see FIG. 2), such as a transmissive display (or a reflected image arrangement in other embodiments), in front of the mechanical reels 32. If the wagering game conducted via the gaming terminal 11 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 11 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 11), streamed (e.g., from a gaming network), or received as a TV signal (e.g., either broadcast or via cable) and such images can take different forms, such as animated images, computer-generated images, or “real-life” images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen mounted over the primary display area 14 and/or the secondary display area 16 and having one or more soft touch keys. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 11 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

FIG. 1 depicts the gaming system 11 having the gaming machine 11 with an attached gaming chair 40. The gaming chair 40 is located in operational proximity of the gaming machine 11. For instance, in the illustrated embodiment of FIG. 1, the gaming chair 40 is mounted to the gaming floor immediately adjacent and in opposing relation to the gaming machine 11. The gaming chair 40 is operable to receive and process signals from the gaming machine 11. In this example, the gaming chair 40 is electrically and mechanically coupled to the gaming machine 1 via a sled 54. Alternatively, the gaming chair 40 may be detachably coupled to the gaming machine 11 or may lack any physical connection with the gaming machine 11. As additional design options, the gaming chair 40 may be operatively coupled to the gaming machine 11 via alternative means, such as a wireless interface (e.g., infrared, radio, laser, or other wireless communication technologies) or other hard line connections (e.g., fiber optic cabling). Also, as described below, the gaming chair 40 may be automated to provide, for example, simulated motions related to events occurring during game play.

Figure 2:
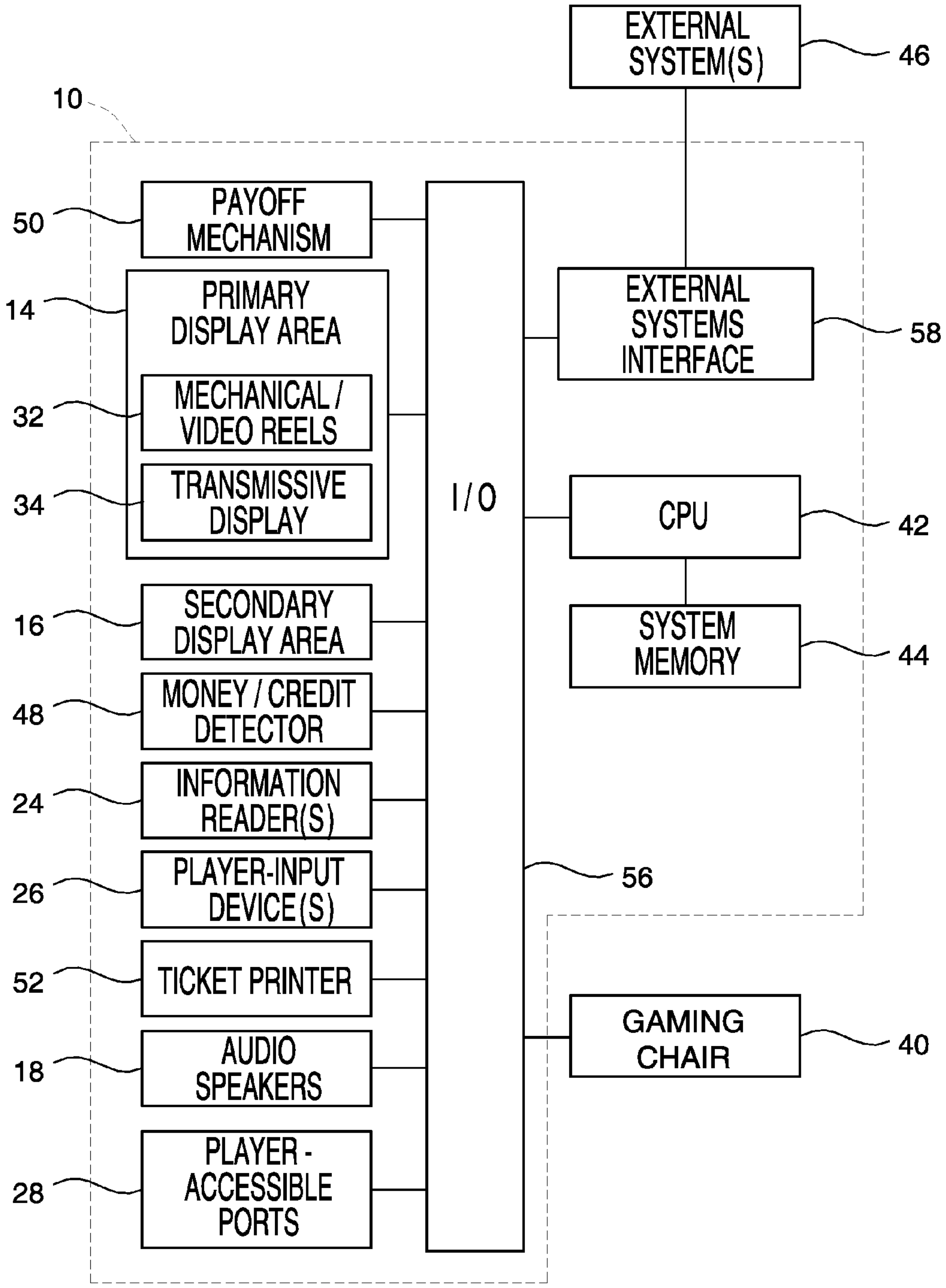
FIG. 2 (PRIOR ART)
FIG. 2 is a schematic diagram of a gaming system with a gaming chair according to an embodiment of the present invention.

Turning now to FIG. 2, the various components of the gaming terminal 11 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 11 that is configured to communicate with and/or control the transfer of data between the gaming terminal 11 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 11 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20 (see FIG. 1), the coin acceptor, or via other sources, such as a cashless gaming account, etc. The value-input device(s) is integrated with the housing 12 of the gaming terminal 11 and is connected to the remainder of the components of the gaming terminal 11, as appropriate, via a wired connection, such as I/O 56, or wireless connection. The money/credit detector 48 detects the input of valid funds into the gaming terminal 11 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 11, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 11 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 11 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 11 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 11 ("thick client" gaming terminal), the external systems 46 ("thin client" gaming terminal), or are distributed therebetween in any suitable manner ("intermediate client" gaming terminal).

Figure 3:
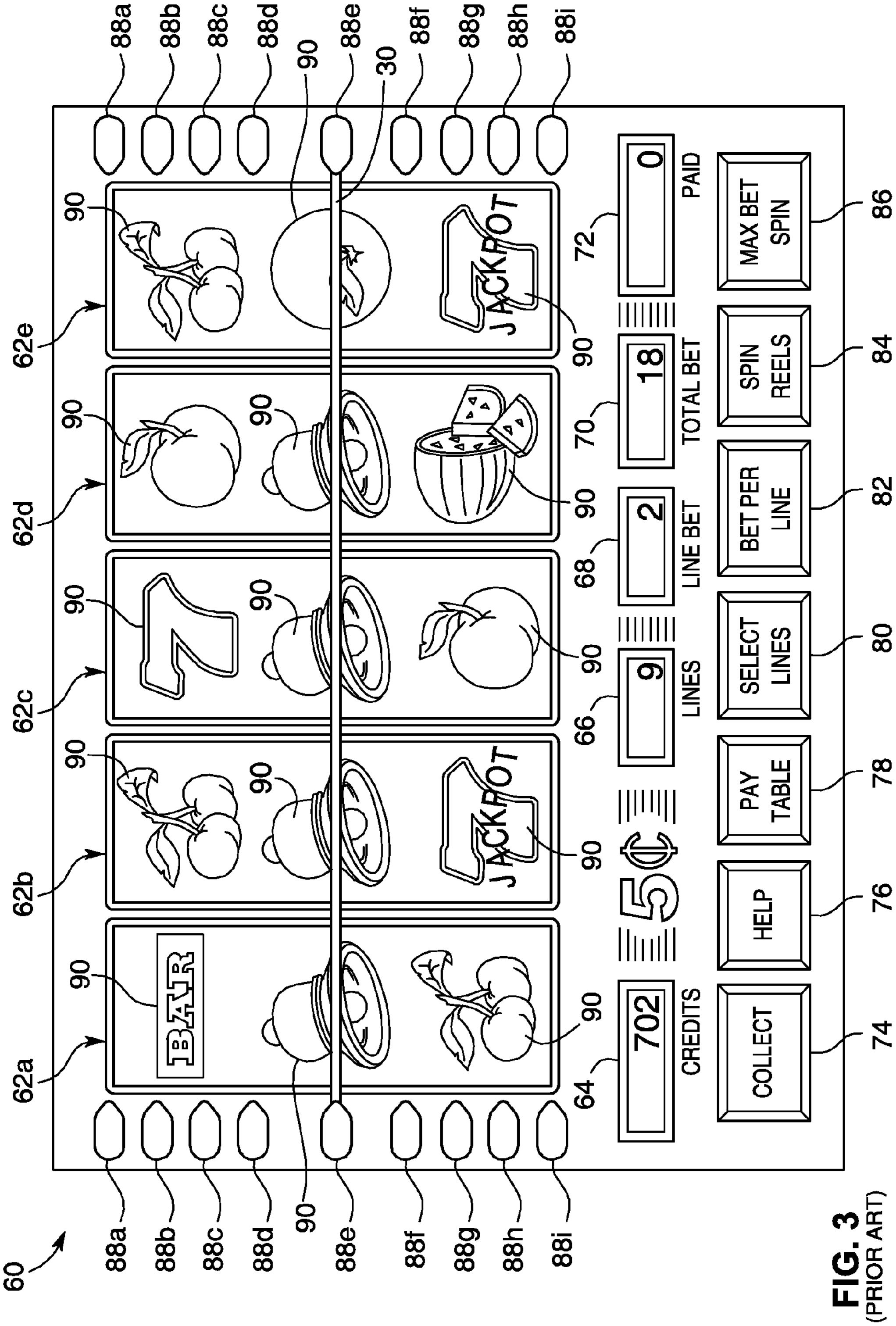
FIG. 3 (PRIOR ART)
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen, soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 11 depicted in FIG. 1, following receipt of an input from the player to initiate the wagering game. The gaming terminal 11 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 11 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 11 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 11 comprise a greater or lesser number of reels in accordance with the present invention.

Figure 4:
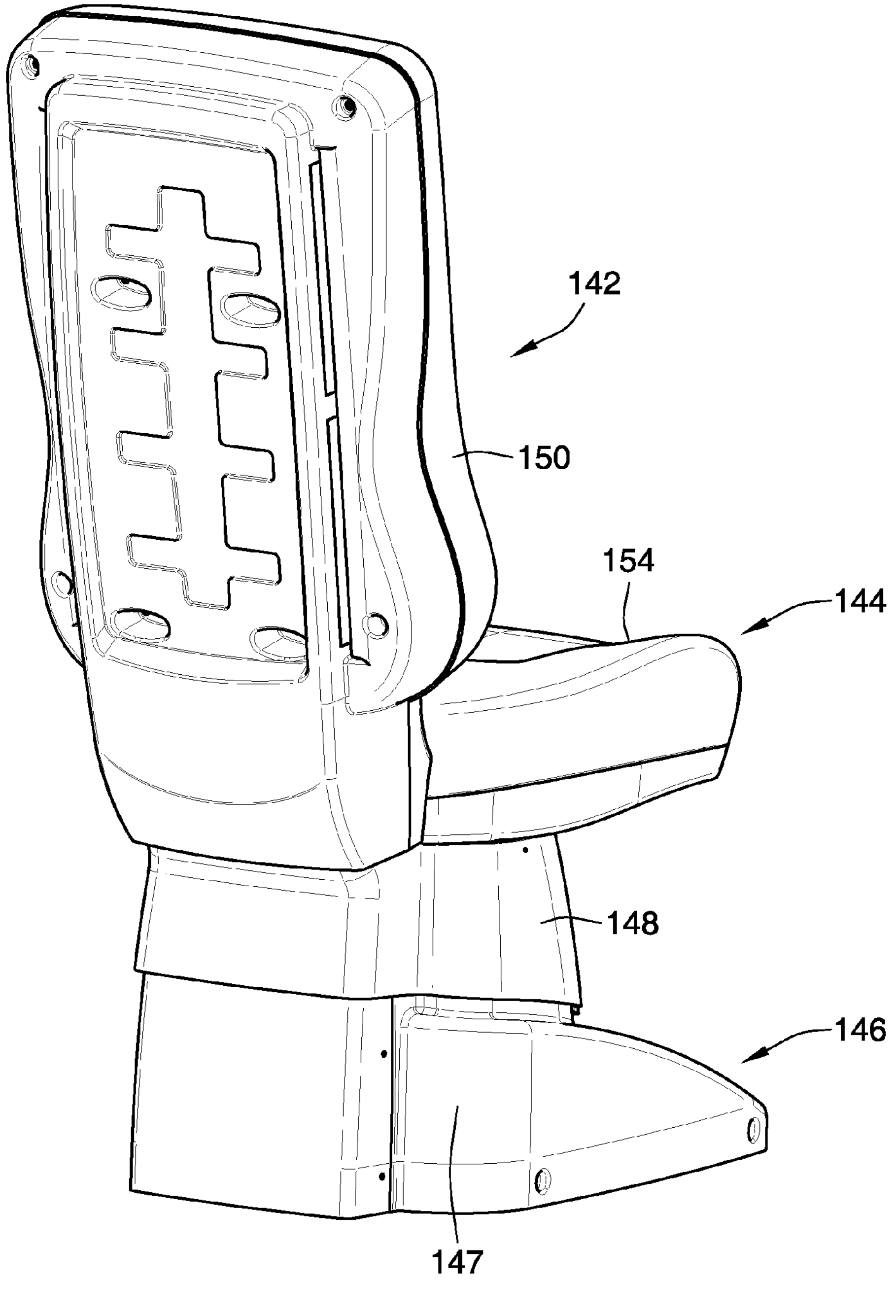
FIG. 4 is a back perspective view of a gaming chair, according to an embodiment of the present invention.

Turning now to FIG. 4, the gaming system 10 includes a gaming chair 140 includes a backrest assembly 142 and a seat assembly 144, both of which are functionally supported on a base (or "platform assembly") 146. The backrest assembly 142 and the seat assembly 144 may be swivel mounted to the base 146 to ease entry and alighting from the gaming system 10. Moreover, the height and angle of the backrest assembly 142 may be individually and/or collectively adjustable. The base 146 is stationary and has an aesthetic cover 147 that protects electronics and a seat motion actuator system.

Communication between the gaming chair 140 and a gaming machine, such as gaming terminal 11 of FIG. 1, may be accomplished in a variety of ways, including wireless transceivers, direct connectivity, or otherwise. Similar to the embodiment of FIG. 1, for example, the gaming chair 140 may include a sled with an internal wiring harnesses (not visible in the views provided) that electrically and mechanically couples to the gaming machine or system. The gaming chair 140 may also be operable to receive input from a player through various input devices, such as a button panel, joystick, mouse, or motion sensor(s) (not shown), located, for example, on a pivotable armrest. Other features may include, but are not limited to, a ticket printer, a card read/write device, a cup holder, foldout tray, a headphone jack, volume controls, brightness controls, cushion heaters, and a retractable tape for restricting use of the gaming chair 140 and/or corresponding gaming machine/system. Additional gaming chair features and design options are disclosed in commonly-assigned U.S. Patent Application Publication No. 2008/0054561 A1, to Stephen A. Canterbury et al., filed in the United States on Sep. 21, 2007 and titled "Gaming Machine Chair," which is incorporated herein by reference in its entirety.

The gaming chair 140 optionally includes a rubber shroud 148 that is fixed to the seat assembly 144 and is linked to the seat motion. Shroud material allows seat movement with respect to the fixed base 146 and prevents finger pinch between moving and stationary elements of the gaming chair 140.

The backrest assembly 142 includes a vinyl or fabric upholstery 150 that covers a seat urethane foam padding. The seat foam padding is trapped between the upholstery and an inner structure 152 (shown in FIG. 6) of the backrest assembly 142. Similarly, the seat assembly 144 includes upholstery 154 and foam padding.

Figure 5:
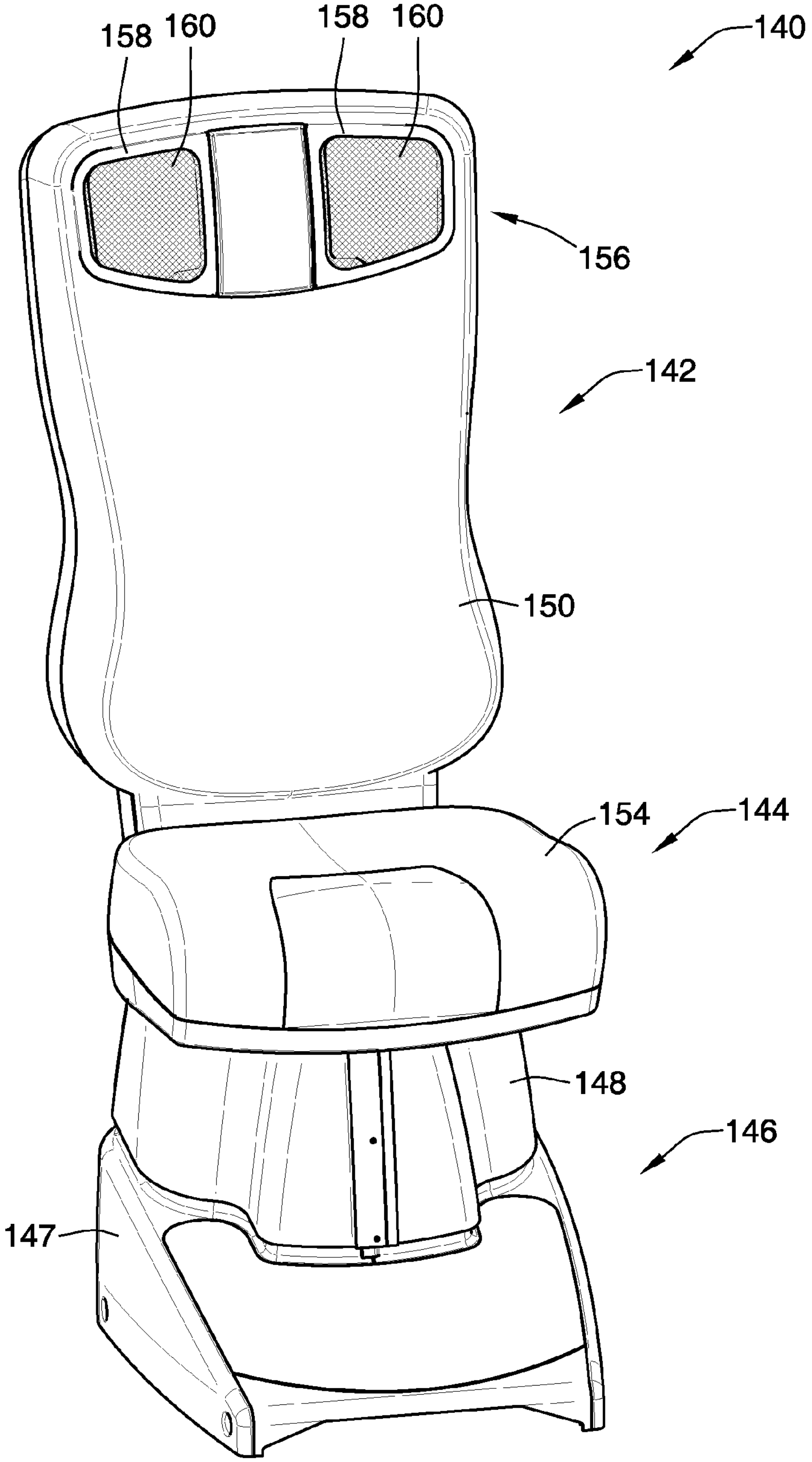
FIG. 5 is a front perspective view of the gaming chair of FIG. 4 with a speaker system, according to an embodiment of the present invention.

Referring to FIG. 5, the backrest assembly 142 includes a speaker system 156 having speakers (not shown) covered by a speaker bezel 158 and a speaker grill 160. The speaker bezel 158 retains the speaker grill 160 and provides a decorative trim that covers the seams of the upholstery 150 and/or foam. The speaker grill 160 is generally a perforated metal grill that allows sound to pass through the perforations. The speaker grill 160 also provides protection for speaker components internal to the backrest assembly 142.

Figure 6:
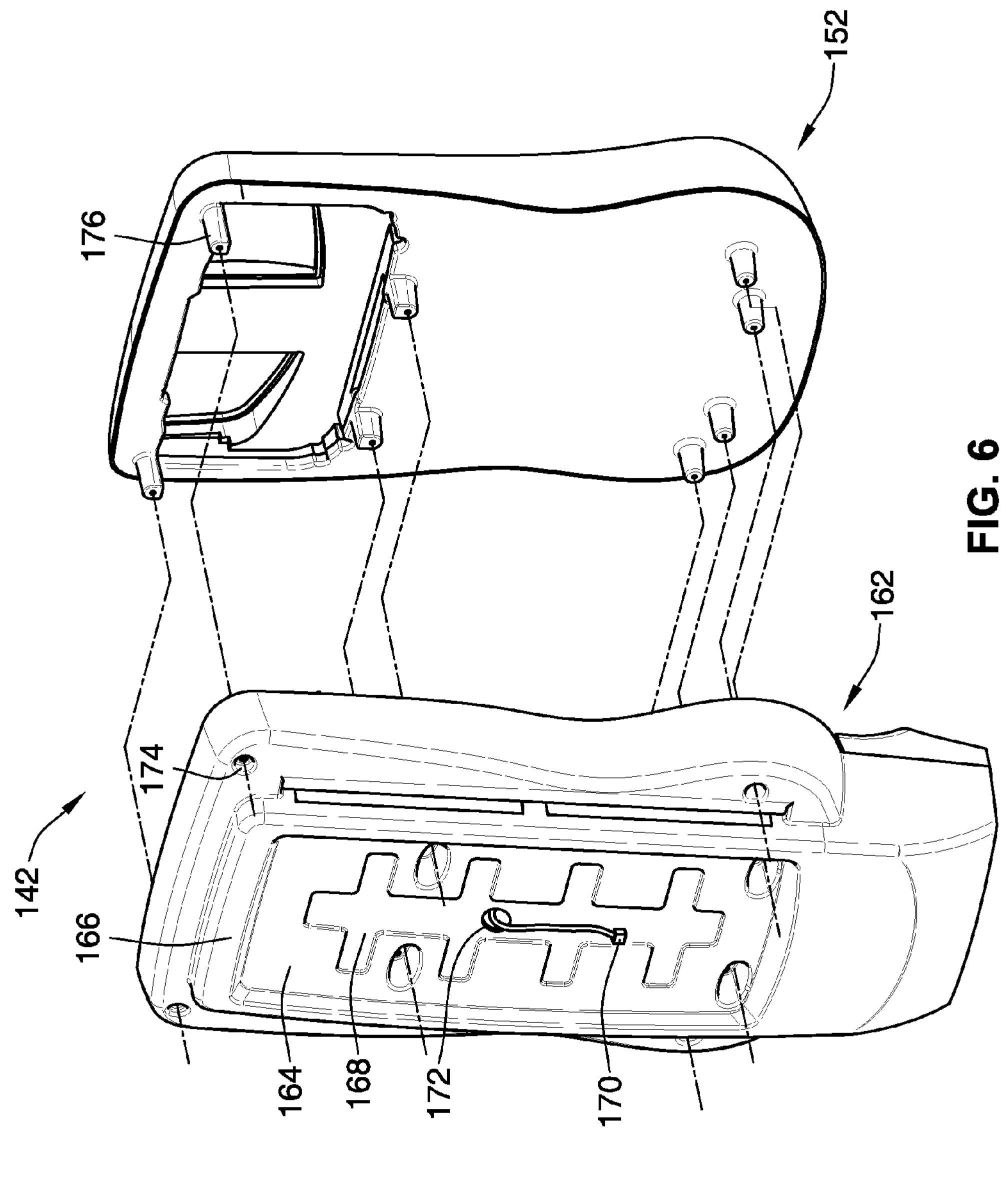
FIG. 6 is a perspective view of a backrest assembly having a back housing shown in an unmounted position, according to an embodiment of the present invention.

Referring to FIG. 6, the backrest assembly 142 includes a back housing 162 that is mounted to the inner structure 152. The back housing 162 includes a modular mounting feature 164 for receiving, one at a time, modular back panels, such as a non-illuminated back panel 165 (see FIG. 7A) and an illuminated back panel 167 (see FIG. 7B). For example, the modular mounting feature 164 is a pocket recessed towards the interior of the backrest assembly 142 for receiving a respective modular back panel 165, 167 at least partially inside the back housing 162. The pocket may be recessed such that the received modular back panel 165, 167 is below or flush with an exterior surface 166 of the back housing 162.

The back housing 162 optionally includes a plurality of depressions 168. The depressions 168 may be cross-shaped and may provide a number of advantages. For example, the depressions 168 provide rigidity to the back housing 162 and ensure dimensional stability and flatness of the received modular back panel 165, 167. The depressions 168 also provide a recessed surface for a cable harness 170. The cable harness 170 is fed through a mouse hole 172 in the back housing 162 and hidden behind a standard artwork non-illuminated back panel 165, if the gaming chair 142 is shipped with the non-illuminated back panel 165. As such, the gaming chair 142 is pre-wired for conversion to an illuminated back panel 167, in the future. Optionally, the back housing 162 has a pattern of eight mounting holes 174 for mounting to the inner structure 152 via fasteners such as screws, bolts, etc.

The inner structure 152 is generally a plastic or rigid structural foam piece that supports the foam padding of the backrest assembly 142 and is the structure to which the back housing 162 assembles. The inner structure 152 is attached to a metal frame (not shown) of the gaming chair 142, and includes a pattern of eight mounting holes 176 that match the pattern of holes 174 of the back housing 162.

Figure 7A:
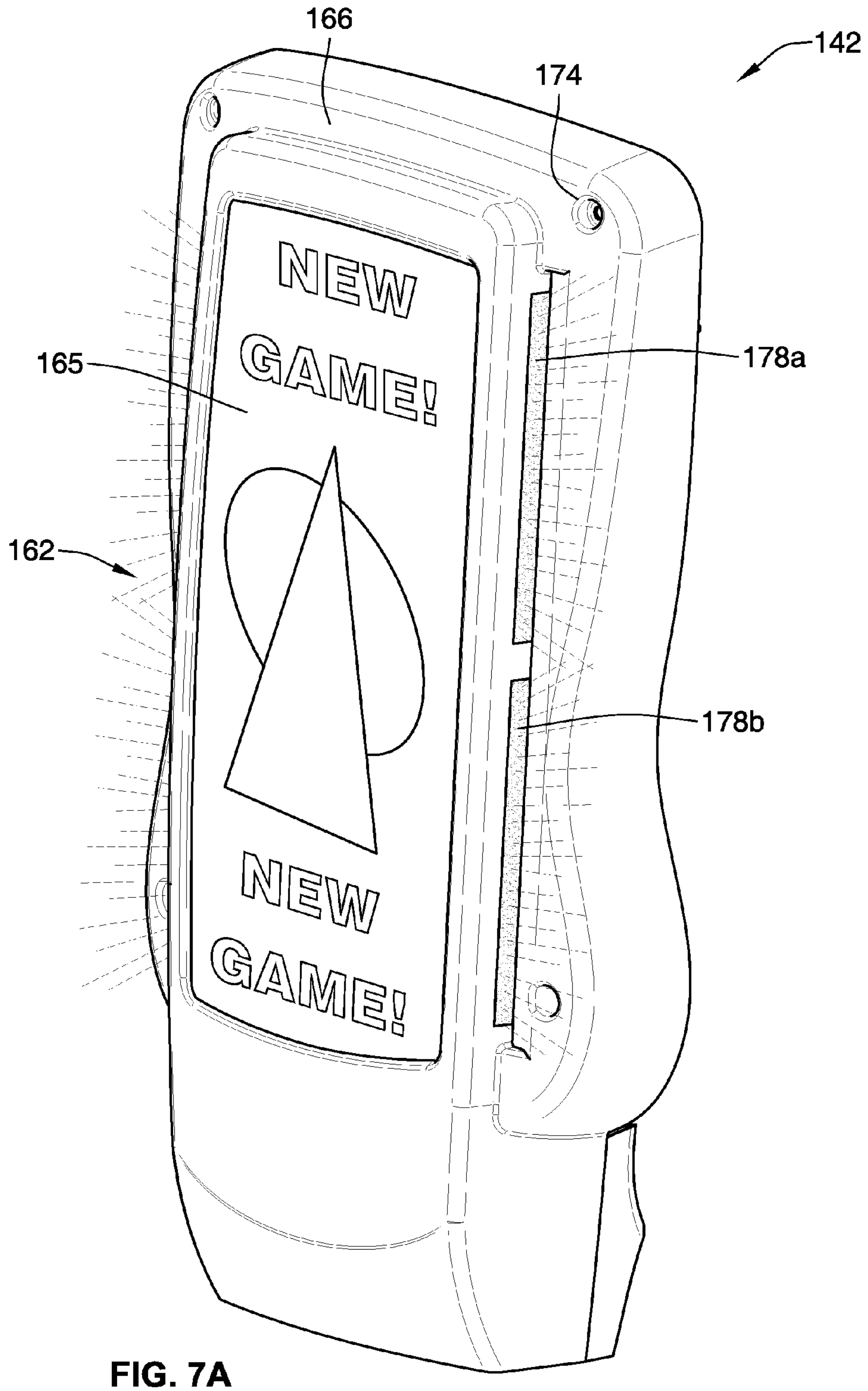
FIG. 7A is a perspective view of a non-illuminated back panel, according to an embodiment of the present invention.

Referring to FIG. 7A, the backrest assembly 142 has the non-illuminated back panel 165 modularly mounted to the back housing 162. The non-illuminated back panel 165 is positioned slightly below the exterior surface 166 of the back housing 162.

The backrest assembly 142 further includes a plurality of lighting lens assemblies aligned along vertical edges of the back housing 162. The lighting lens assemblies can provide emotive or static ambient lighting for the gaming chair 140. For example, the back housing has a total of four lighting lens assemblies, including a first lens assembly **178*a* aligned along a top-right vertical edge, a second lens assembly 178*b*** aligned along a bottom-right vertical edge, a third lens assembly aligned along a top-left vertical edge (not shown), and a fourth lens assembly aligned along a bottom-left vertical edge.

According to one embodiment, the lighting lens assemblies may provide lighting independent of the back panels 165, 167. For example, the lighting lens assemblies may provide ambient lighting regardless of whether the mounted back panel is the non-illuminated back panel 165 or the illuminated back panel 167. Similarly, the lighting lens assemblies may not provide lighting, i.e., be turned off, regardless of whether the mounted back panel is the non-illuminated back panel 165 or the illuminated back panel 167.

Figure 7B:
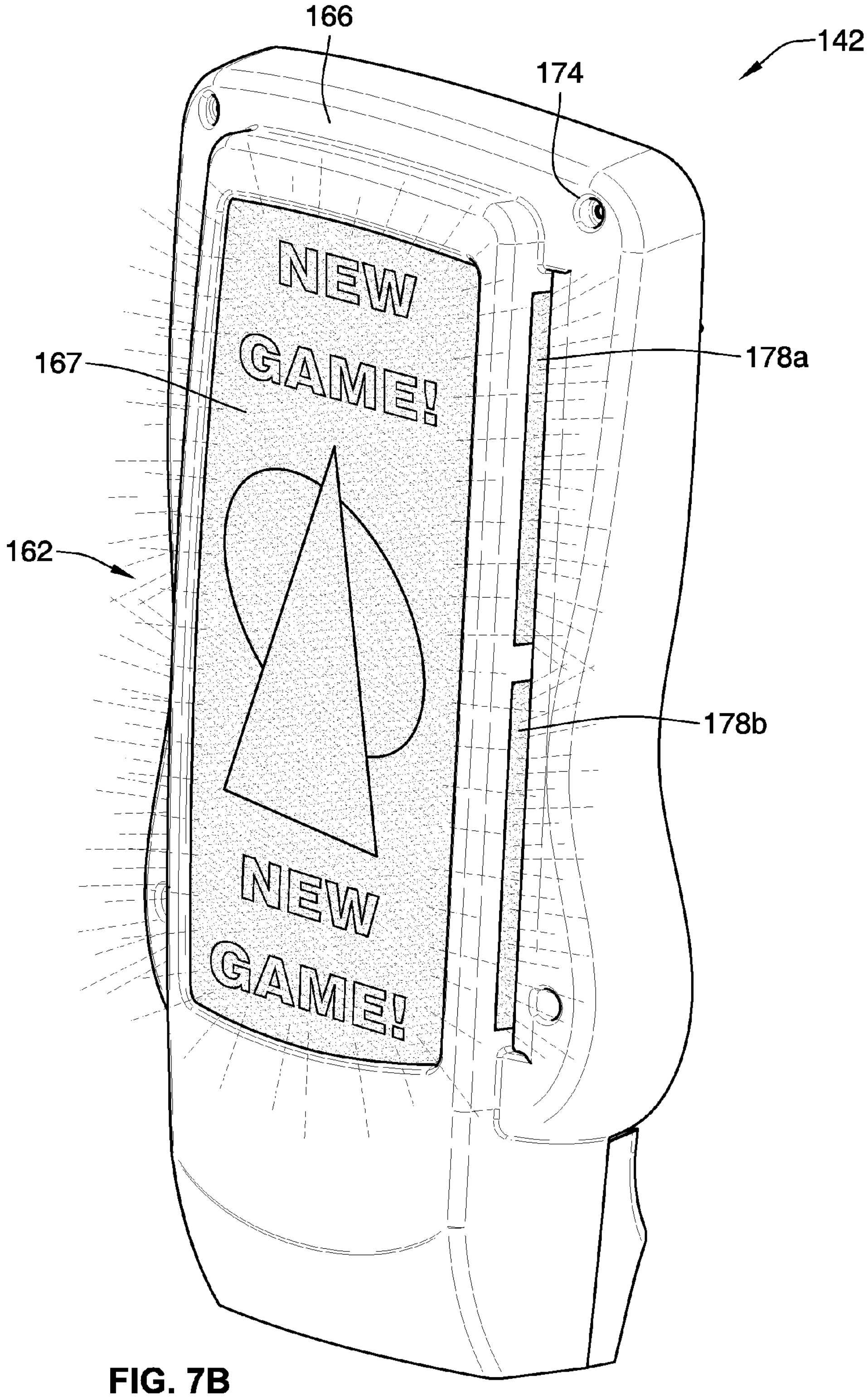
FIG. 7B is a perspective view of an illuminated back panel, according to an embodiment of the present invention.

Referring to FIG. 7B, the backrest assembly 142 has the illuminated back panel 167 modularly mounted to the back housing 162. Similarly, if not identically, to the non-illuminated back panel 165, the illuminated back panel 167 is positioned slightly below the exterior surface 166 of the back housing 162.

Figure 8A:
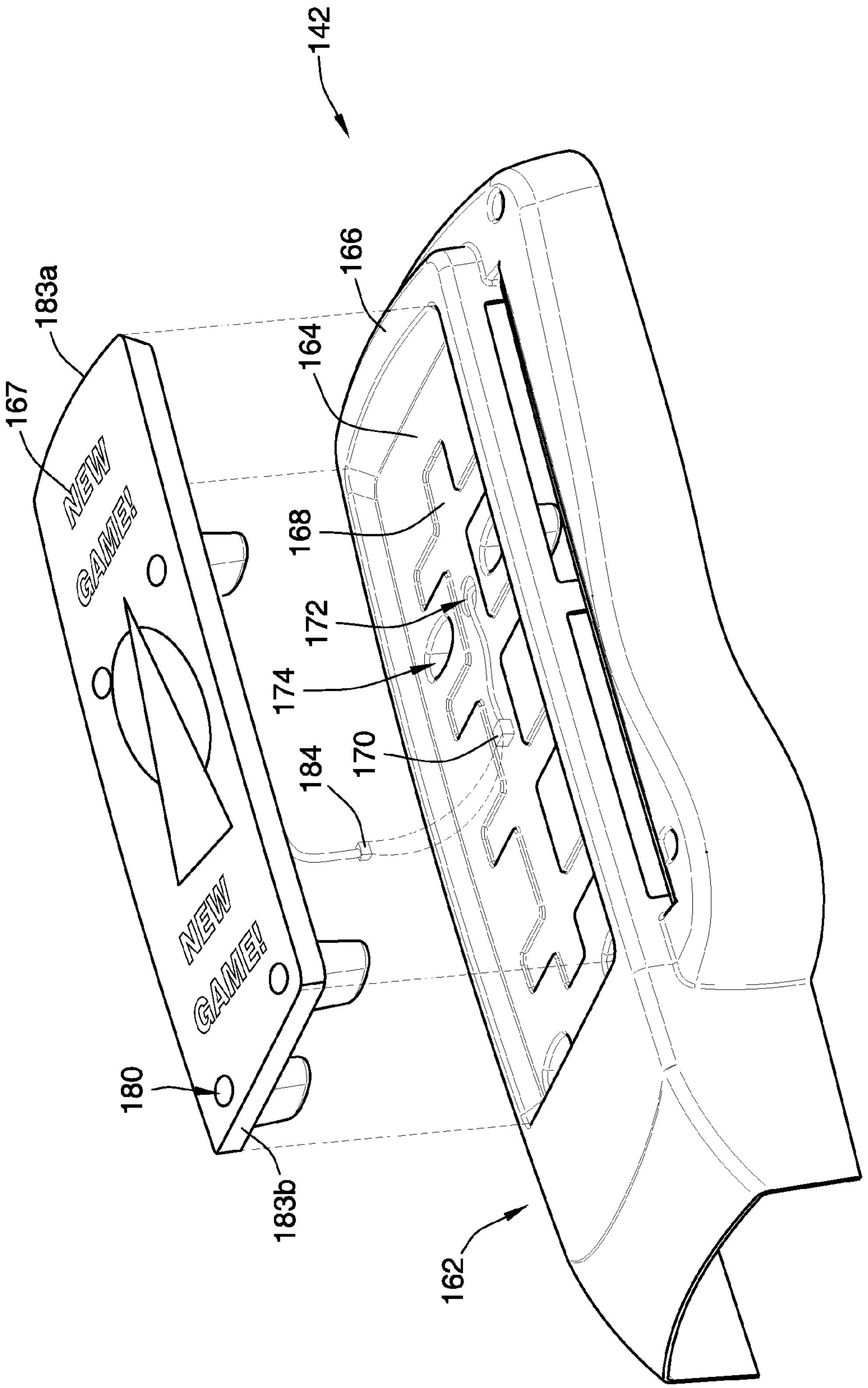
FIG. 8A is a perspective view of an illustration showing an emotive lighting module, according to an embodiment of the present invention.

Referring to FIG. 8A, the illuminated back panel 167 is an emotive lighting module that attaches in the same mounting bolt locations as the back housing 162. For example, the illuminated back panel 167 includes four bolt holes 180 that match receiving ones of the holes 174. To convert the backrest assembly 142 to the illuminated back panel 167, a technician removes the non-illuminated back panel 165 and replaces it with the illuminated back panel 167. According to one embodiment, the illuminated back panel 167 is pre-assembled with emotive lighting printed circuit boards 182 (see FIG. 8B) manufactured by WMS Gaming, Inc and aligned along a top edge **183*a* and a bottom edge 183*b*. The illuminated back panel 167 has a connector 184 that accepts the cable harness 170** for electrical communication.

Figure 8B:
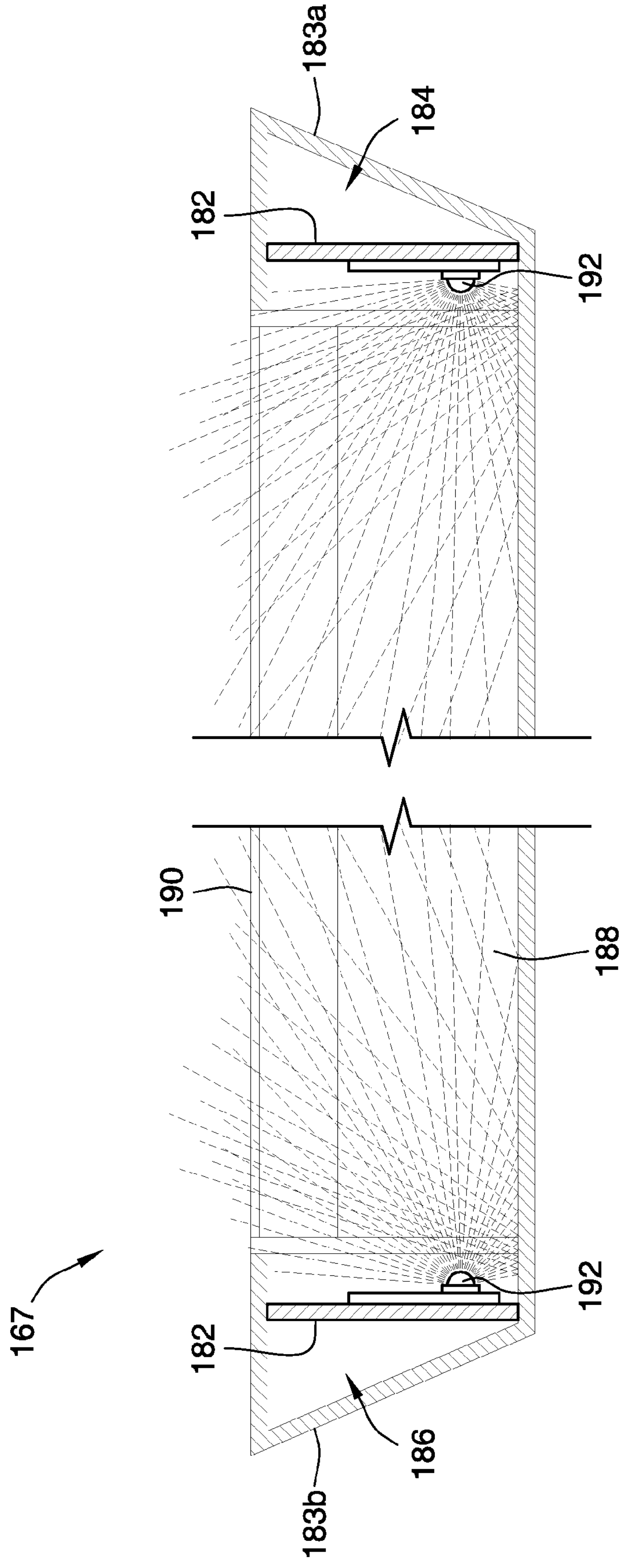
FIG. 8B is a side view of an illustration showing the emotive lighting module of FIG. 8A, according to an embodiment of the present invention.

Referring to FIG. 8B, the illuminated back panel 167 has a top plastic endcap assembly 184, a bottom plastic endcap assembly 186, a transparent polycarbonate panel 188, and a translucent artwork panel 190. Each of the endcap assemblies 184, 186 include a respective printed circuit board 182 and a plurality of light-emitting diodes 192 aligned along an internal side of the printed circuit board 182. Each of the printed circuit boards 182 is aligned along a respective top/bottom edge **183*a*, 183*b* of the illuminated back panel 167**.

The polycarbonate (or polymer) panel 188 is embedded with light diffusing elements. As such, when the light-emitting diodes 192 are lit, the polycarbonate panel 188 lights up to provide an emotive lighting experience or a static lighting experience to the illuminated back panel 167.

Figure 9B:
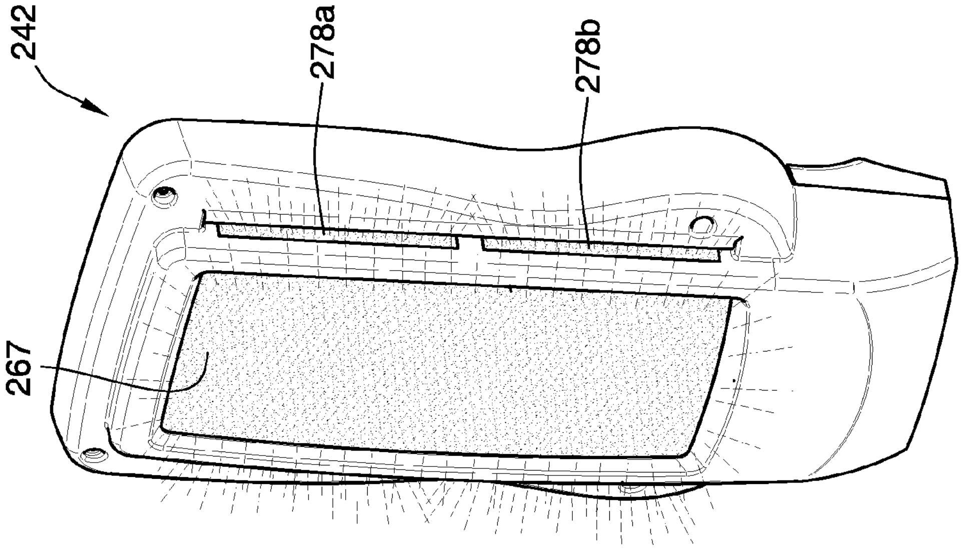
FIG. 9B is a perspective assembled view of FIG. 9A, according to an embodiment of the present invention.
Figure 9A:
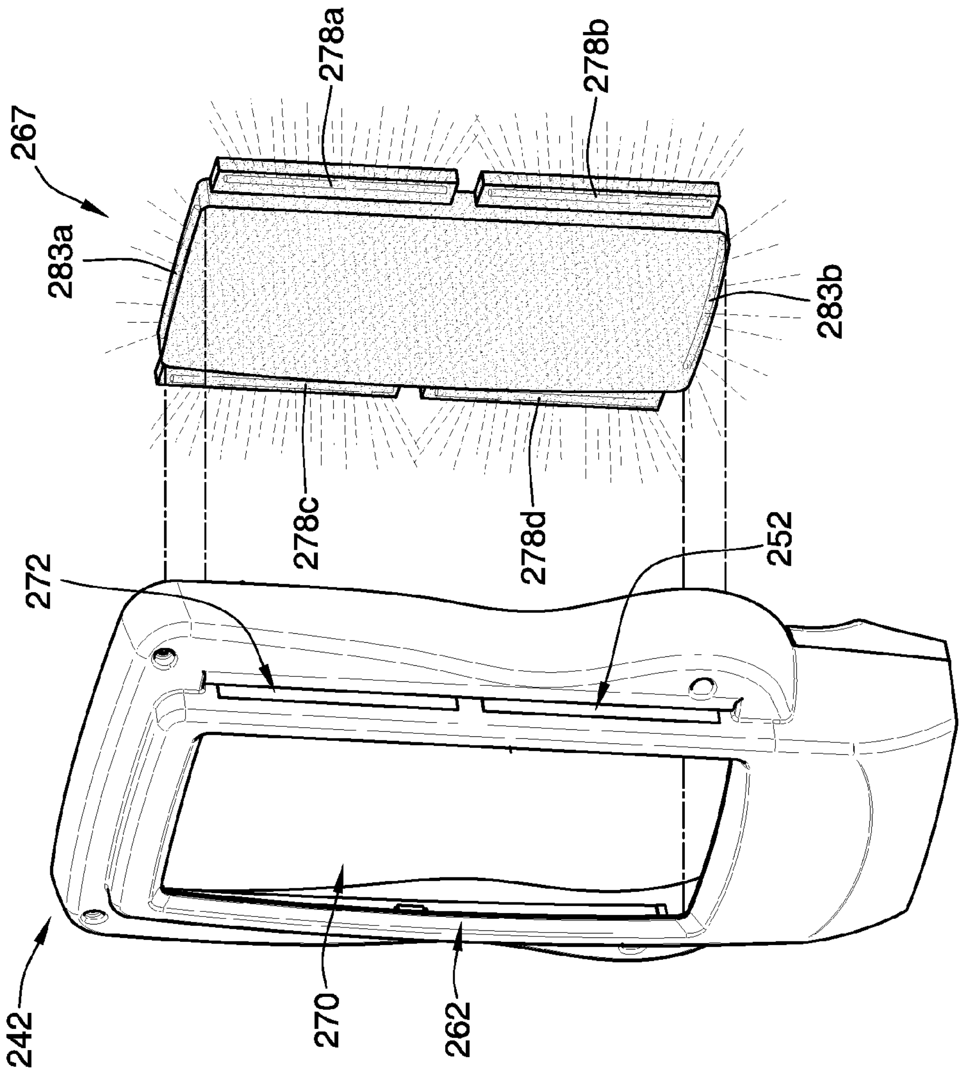
FIG. 9A is a perspective exploded view of a backrest assembly having a center panel cut out and an illuminated panel assembly with integrated emotive lighting for a back panel and for side lenses, according to an embodiment of the present invention.

Referring to FIGS. 9A-9B, a backrest assembly 242 has a back housing 262 with a cut-out center area 270 and a plurality of cut-out slits 272, according to an alternative embodiment of the present invention. An illuminated back panel 267 attaches to the back housing 262 from the inside of the backrest assembly 242. According to this embodiment, the illuminated back panel 267 includes top and bottom plastic endcap assemblies 283*a*, 283*b* and integrated lens assemblies 278*a*-278*d*. The endcap assemblies 283*a*, 283*b* include respective printed circuit boards and light-emitting diodes similar to the embodiment described above in reference to FIGS. 8A and 8B. The lens assemblies 278*a*-278*d* are generally similar to the lighting lens assemblies 178*a*, 178*b*, described above in reference to FIG. 7A, except that instead of the lens assemblies being part of the back housing they are now part of the illuminated back panel. Optionally, if a non-illuminated back panel is mounted to the back housing 262, the non-illuminated back panel may include blank sections where the lighting lens assemblies 278*a*-278*d* would otherwise be positioned.

Figure 10B:
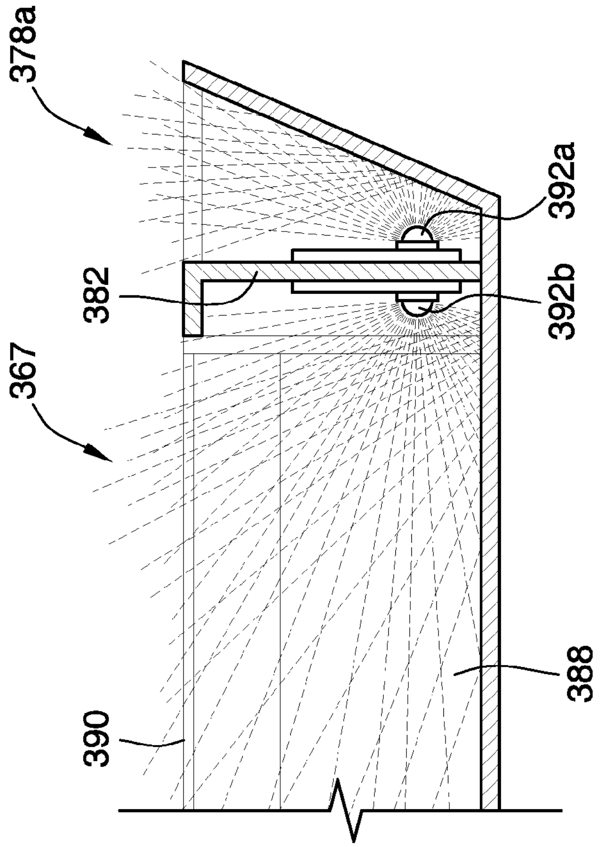
FIG. 10B is a side view of an illustration showing the illuminated panel assembly of FIG. 10A, according to an embodiment of the present invention.
Figure 10A:
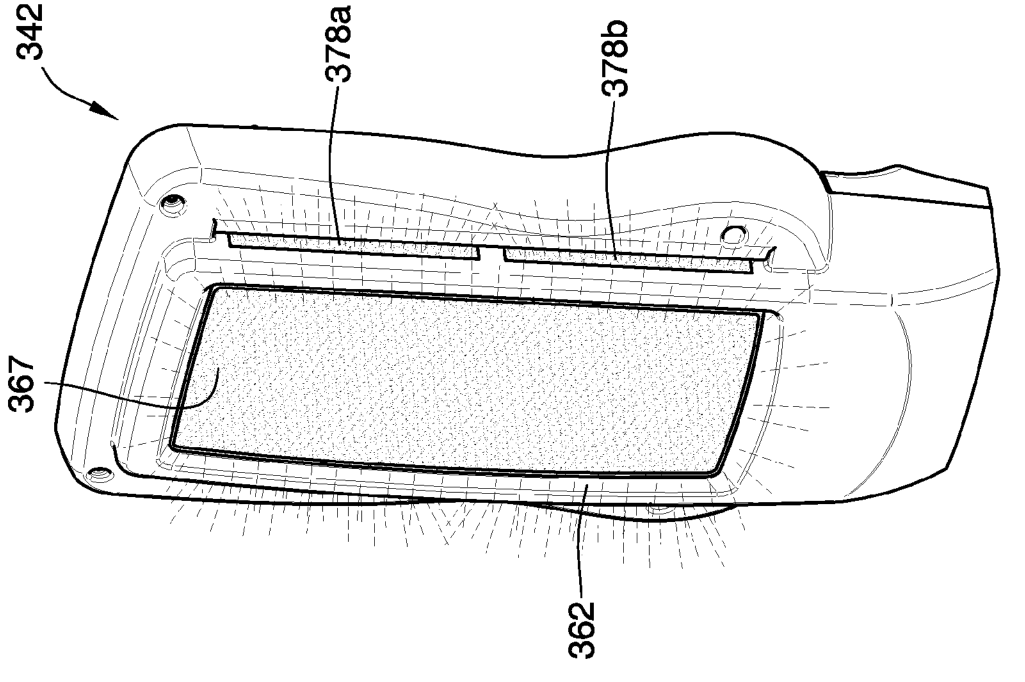
FIG. 10A is a perspective view of a backrest assembly with a mounted illuminated panel assembly having emotive lighting on both sides of a circuit board, according to an embodiment of the present invention.

Referring to FIG. 10A, according to an alternative embodiment a backrest assembly 342 has a back housing 362 to which an illuminated back panel 367 attaches. According to this embodiment, the illuminated back panel 367 includes a double-row of light-emitting diodes 392*a*, 392*b* to provide illumination for artwork of the illuminated back panel 367 and for general ambience. In other words, in comparison to the embodiment described above in reference to FIGS. 9A-9B, this embodiment does not require endcap assemblies similar to the endcap assemblies 283*a*, 283*b*. Instead, only a plurality of lighting lens assemblies (of which only two lens assemblies 378*a*, 378*b* are shown) are used.

Referring to FIG. 10B, the illuminated back panel 367 has a first lighting lens assembly 378*a* aligned along a top-right vertical edge, a transparent polycarbonate panel 388, and a translucent artwork panel 390. The first lighting lens assembly 378*a* includes a printed circuit board 382 along which is an exterior row of light-emitting diodes 392*a* and an interior row of light-emitting diodes 392*b*. The exterior light-emitting diodes 392*a* provide general ambience lighting (emotive or static) and the interior light-emitting diodes 392*b* provide lighting (emotive or static) for the illuminated back panel 367. Each of the plurality of lighting lens assemblies includes a similar arrangement of printed circuit board 382 and light-emitting diodes 392*a*, 392*b*. The interior light-emitting diodes 392*b* provide generally the lighting that was being provided by the light-emitting diodes 192 of the endcap assemblies 184, 186 described above in reference to FIG. 8B.

Each of these embodiments and obvious variations thereof is contemplated as falling within the spirit and scope of the claimed invention, which is set forth in the following claims.

What is claimed is:

1. A gaming system comprising:

a gaming machine for playing a wagering game, the gaming machine including
  at least one display configured to display outcomes of the wagering game,
  at least one wager input device configured to receive wagers from players; and
  a gaming chair including
    a base,
    a seat assembly attached to the base,
    a cable harness for providing electrical input, and
    a backrest assembly having
      an inner structure,
      a non-illuminated modular back panel,
      an illuminated modular back panel having a connector; and
      a back housing mounted to the inner structure, the back housing having a modular mounting feature configured to receive one of the modular back panels, the modular back panels being received one at a time.

2. The gaming system of claim 1, wherein the modular mounting feature includes a pattern of mounting holes for securing a respective one of the modular back panels to the back housing.

3. The gaming system of claim 1, wherein the modular mounting feature includes a pocket for receiving a respective one of the modular back panels at least partially inside the back housing.

4. The gaming system of claim 1, wherein the back housing further includes a plurality of depressions.

5. The gaming system of claim 1, wherein the back housing further includes an access hole.

6. The gaming system of claim 1, wherein the back housing is mounted to the inner structure via a first pattern of holes, each of the modular back panels having a second pattern of holes that match the first pattern of holes.

7. The gaming system of claim 1, wherein the illuminated back panel includes at least one emotive lighting module.

8. The gaming system of claim 1, wherein the illuminated back panel includes a translucent artwork panel illuminated by a transparent polymer panel with embedded light diffusing elements, the transparent polymer panel being mounted generally parallel to the translucent artwork panel in the illuminated back panel.

9. The gaming system of claim 1, wherein the illuminated back panel includes a printed circuit board and a plurality of light-emitting diodes for illumination.

10. The gaming system of claim 9, wherein the printed circuit board is mounted along at least one edge of the illuminated back panel.

11. The gaming system of claim 9, wherein the plurality of light-emitting diodes are mounted on at least one side of the printed circuit board for illumination.

12. A gaming system for playing a wagering game, the gaming system comprising:
  a gaming machine;
  a non-illuminated modular back panel;
  an illuminated modular back panel; and
  a gaming chair including a backrest assembly supported by a base, the backrest assembly having a back housing with a modular mounting feature configured to receive one of the modular back panels, the illuminated back panel being in electrical communication with the gaming chair when received by the modular mounting feature and the modular back panels received one at a time.

13. The gaming system of claim 12, wherein the gaming chair includes a cable harness for attachment to an electrical connector of the illuminated back panel.

14. The gaming system of claim 12, wherein the modular mounting features includes a pocket shaped to receive each of the modular back panels in an area indented inward towards an interior area of the backrest assembly.

15. The gaming system of claim 12, wherein the illuminated back panel includes at least one emotive lighting module.

16. The gaming system of claim 12, wherein the illuminated back panel includes a translucent artwork panel illuminated by a transparent polymer panel with embedded light diffusing elements, the transparent polymer panel being mounted generally parallel to the translucent artwork panel in the illuminated back panel.

17. The gaming system of claim 16, wherein the transparent polymer panel is lit by a plurality of light-emitting diodes mounted near a printed circuit board, the plurality of light-emitting diodes being mounted along at least one side of the printed circuit board.

18. The gaming system of claim 17, wherein a first printed circuit board is mounted along a top horizontal edge of the illuminated back panel and a second printed circuit board is mounted along a bottom horizontal edge of the illuminated back panel.

19. The gaming system of claim 17, wherein a first printed circuit board is mounted along a top-left vertical edge of the illuminated back panel, a second printed circuit board is mounted along a bottom-left vertical edge of the illuminated back panel, a third printed circuit board is mounted along a top-right vertical edge of the illuminated back panel, and a fourth printed circuit board is mounted along a bottom-right vertical edge of the illuminated back panel.

20. The gaming system of claim 19, wherein a plurality of light-emitting diodes is mounted on each of two opposing sides of the first printed circuit board, the second printed circuit board, the third printed circuit board, and the fourth printed circuit board.

21. A gaming system comprising a gaming machine;

a non-illuminated modular back panel;

an illuminated modular back panel; and a gaming chair for conducting a wagering game, the gaming chair having a base for supporting a seat assembly and a backrest assembly, the backrest assembly having a modular feature such that a back housing of the backrest assembly configured to modularly receive, one at a time, one of a plurality of different back panels, the back panels including the non-illuminated back panel and the illuminated back panel, the backrest assembly having an electrical connection for providing electrical input to the illuminated back panel.

22. The gaming system of claim 21, wherein the modular feature includes a pocket shaped to receive each of the plurality of different back panels in an area indented towards an interior area of the backrest assembly.

23. The gaming system of claim 21, wherein the illuminated back panel includes at least one emotive lighting module.

24. The gaming system of claim 21, wherein the illuminated back panel includes a translucent artwork panel illuminated by a transparent polymer panel with embedded light diffusing elements, the transparent polymer panel being mounted generally parallel to the translucent artwork panel in the illuminated back panel.

25. The gaming system of claim 24, wherein the transparent polymer panel is lit by a plurality of light-emitting diodes mounted on at least one side of a printed circuit board, the printed circuit board being mounted along one or more edges of the illuminated back panel.

26. A method for transforming a gaming chair of a gaming system, the gaming system including a gaming machine for conducting a wagering game, the gaming chair including a backrest assembly supported by a base, the backrest assembly having a back housing with a modular mounting feature configurable to receive one of a plurality of modular back panels, the method comprising:

mounting, by the modular mounting feature, a first modular back panel, the first modular back panel being one of an illuminated back panel and a non-illuminated back panel;

electrically coupling the first modular back panel with the gaming chair if the first modular back panel is the illuminated back panel;

removing the first modular back panel from the modular mounting feature;

mounting, by the modular mounting feature, a second modular back panel, the second modular back panel being the other one of the illuminated back panel and the non-illuminated back panel; and electrically coupling the second modular back panel with the gaming chair if the second modular back panel is the illuminated back panel.

27. The method of claim 26, further comprising securing, one at a time, the first modular back panel and the second modular back panel to the back housing via a pattern of mounting holes, the pattern of mounting holes being the same for both the first modular back panel and the second modular back panel.

28. The method of claim 26, wherein the mounting of the first modular back panel and the second modular back panel includes receiving the first modular back panel and the second modular back panel in a pocket at least partially inside the back housing.

29. The method of claim 26, further comprising illuminating a translucent artwork panel of the illuminated back panel via embedded light diffusing elements of a transparent polymer panel of the illuminated back panel.

30. The method of claim 29, wherein the light diffusing elements receive light from a plurality of light-emitting diodes mounted along at least one side of a printed circuit board and along at least one edge of the illuminated back panel.

* * * * *